(12) United States Patent
Um et al.

(10) Patent No.: US 9,174,535 B2
(45) Date of Patent: Nov. 3, 2015

(54) SYSTEM AND APPARATUS FOR CONTROLLING SPEED IN EXCESS SPEED ENFORCEMENT SECTION

(71) Applicant: Hyundai Motor Company, Seoul (KR)

(72) Inventors: Dae Youn Um, Gyeonggi-do (KR); Jee Young Kim, Gyeonggi-do (KR); Young M. Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/103,282

(22) Filed: Dec. 11, 2013

(65) Prior Publication Data

US 2015/0105993 A1     Apr. 16, 2015

(30) Foreign Application Priority Data

Oct. 10, 2013     (KR) .......................... 10-2013-0120533

(51) Int. Cl.
*B60T 8/32* (2006.01)
*G05D 1/00* (2006.01)
*G06F 7/00* (2006.01)
*G06F 17/00* (2006.01)
*B60K 31/00* (2006.01)

(52) U.S. Cl.
CPC ...................................... *B60K 31/00* (2013.01)

(58) Field of Classification Search
CPC ............ B60K 31/047; B60K 31/0008; B60W 2720/106; B60W 30/16; B60W 10/06
USPC ............................................................ 701/93
See application file for complete search history.

(56) References Cited

U.S. PATENT DOCUMENTS

2009/0157249 A1    6/2009  Yang et al.
2012/0316746 A1*  12/2012  Park ............................... 701/93

FOREIGN PATENT DOCUMENTS

| JP | 09-073600 A | 3/1997 |
| KR | 10-2009-0009473 A | 1/2009 |
| KR | 10-2009-0051357 A | 5/2009 |
| KR | 10-2009-0061924 A | 6/2009 |
| KR | 10-2010-0056003 A | 5/2010 |
| KR | 10-2012-0135949 A | 12/2012 |

* cited by examiner

*Primary Examiner* — Maceeh Anwari
(74) *Attorney, Agent, or Firm* — Mintz Levin Cohn Ferris Glovsky and Popeo, P.C.

(57) ABSTRACT

An apparatus and method for controlling a speed in an excess speed enforcement section are provided. The method includes determining one of a target speed, a lower limit speed, and a speed limit as a final target speed using a relationship between a target speed, a lower limit speed, and a speed limit. A required acceleration is calculated based on the final target speed and the vehicle speed and the vehicle speed is adjusted using the required acceleration.

15 Claims, 3 Drawing Sheets

SYSTEM AND APPARATUS FOR CONTROLLING SPEED IN EXCESS SPEED ENFORCEMENT SECTION

CROSS-REFERENCE TO RELATED APPLICATION

This application is based on and claims priority from Korean Patent Application No. 10-2013-0120533, filed on Oct. 10, 2013 in the Korean Intellectual Property Office, the disclosure of which is incorporated herein in its entirety by reference.

BACKGROUND

1. Field of the Invention

The present invention relates to a method and an apparatus for controlling a speed in an over-speed enforcement section, and more particularly, to controlling a vehicle speed to prevent an excess speed from being generated in an excess speed enforcement section when an average driving speed of the vehicle exceeds a speed limit in a section from an enforcement start point to an enforcement termination point.

2. Description of the Prior Art

A smart cruise control (SCC) system is a system that provides convenience and safety to a driver by adjusting a vehicle speed to a predetermined speed set by the driver when preceding vehicles are not present, and adjusting a distance to maintain a predetermined distance between the vehicles when the vehicles exist in front.

Since this SCC system does not obtain speed limit information and position information of speed enforcement detector (e.g., camera, etc.) on a road, an excess speed is determined by the speed enforcement detector when the driver sets the speed of the vehicle to exceed the speed limit of the road. In particular, when the driver engages a brake pedal to avoid detection of an excess speed (e.g., a speed greater than a speed limit), an operation of the SCC system is released, and thus the SCC system must be turned back on after passing through the speed enforcement detector.

Therefore, a method of adjusting the vehicle speed to the speed limit or less when the speed enforcement detector is detected on the road has been suggested. However, this related art is useful in a location enforcement method of enforcing the excess speed of the vehicle at a specific location, but may have decreased utility of a point to point enforcement method of enforcing when the average driving speed of the vehicle between two points exceeds the speed limit.

SUMMARY

Accordingly, the present invention provides a method and an apparatus for controlling a speed in an excess speed enforcement section to prevent an excess speed from being generated in the excess speed enforcement section by adjusting a vehicle speed in the excess speed enforcement section that enforces when an average driving speed of the vehicle exceeds a speed limit in a section from an enforcement start point to an enforcement termination point.

In one aspect of the present invention, an apparatus for controlling a speed in an excess speed enforcement section may include a plurality of units executed by a controller. The plurality of units may include: a navigation inter-working unit that collects a vehicle speed $v_c$, excess speed enforcement section information, a speed limit $v_l$ of the excess speed enforcement section, and an average driving speed $v_d$ in the excess speed enforcement section; a target speed calculating unit that calculates a target speed $v_t$ based on the speed limit $v_l$ and the average driving speed $v_d$; a lower limit speed calculating unit that calculates a lower limit speed $v_m$ based on the speed limit $v_l$; a target speed determining unit that determines any one of the target speed $v_t$, the lower limit speed $v_m$, and the speed limit $v_l$ as the final target speed $v_f$ using a relationship between the target speed $v_t$, the lower limit speed $v_m$, and the speed limit $v_l$; and a required acceleration calculating unit that calculates a required acceleration a based on the final target speed $v_f$ and the speed $v_c$ of the vehicle; wherein the controller adjusts the speed of the vehicle using the required acceleration a.

In another aspect of the present invention, a method for controlling a speed in an excess speed enforcement section may include: collecting, by a controller, a vehicle speed $v_c$, excess speed enforcement section information, a speed limit $v_l$ of the excess speed enforcement section, and an average driving speed $v_d$ in the excess speed enforcement section; calculating, by the controller, a target speed $v_t$ based on the speed limit $v_l$ and the average driving speed $v_d$; calculating, by the controller, a lower limit speed $v_m$ based on the speed limit $v_l$; determining, by the controller, any one of the target speed $v_t$, the lower limit speed $v_m$, and the speed limit $v_l$ as the final target speed $v_f$ using a relationship between the target speed $v_t$, the lower limit speed $v_m$, and the speed limit $v_l$; calculating, by the controller, a required acceleration a based on the final target speed $v_f$ and the speed $v_c$ of the vehicle; and adjusting, by the controller, the speed of the vehicle using the required acceleration a.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
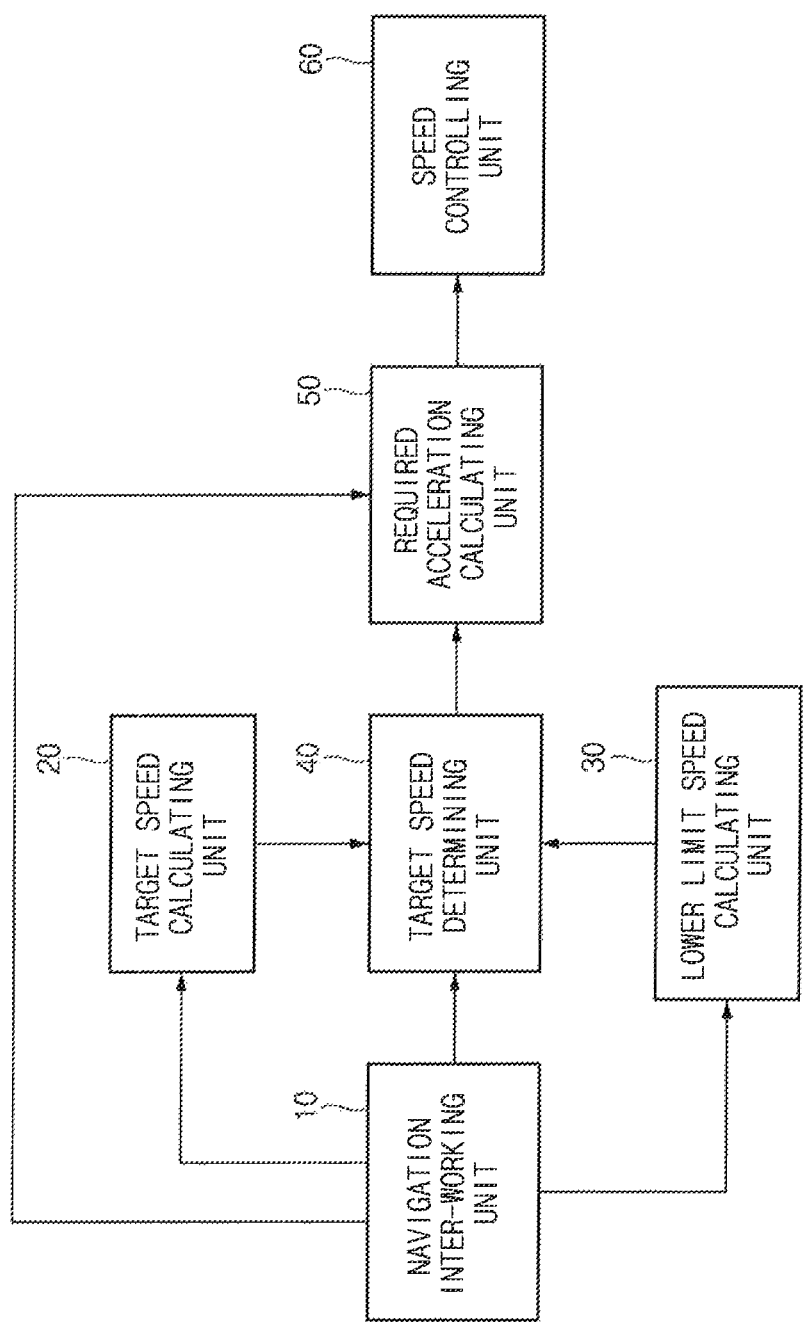
FIG. 1 is an exemplary configuration diagram of an apparatus for controlling a speed in an excess speed enforcement section according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

FIG. 1 is an exemplary configuration diagram of an apparatus for controlling a speed in an excess speed enforcement section according to an exemplary embodiment of the present invention. As shown in FIG. 1, the apparatus for controlling the speed in the excess speed enforcement section may include a plurality of units executed by a controller 60 (e.g., a speed controller) having a processor and a memory. The plurality of units may include a navigation inter-working unit 10, a target speed calculating unit 20, a lower limit speed calculating unit 30, a target speed determining unit 40, and a required acceleration calculating unit 50.

Figure 2:
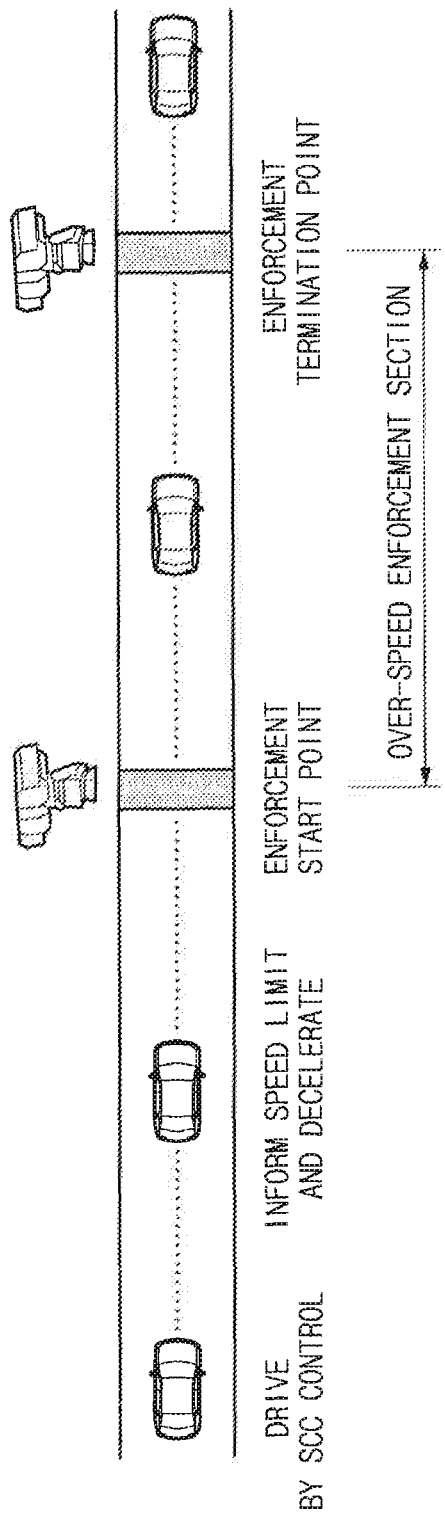
FIG. 2 is an exemplary illustrative diagram of the excess speed enforcement section to which the present invention is applied according to an exemplary embodiment of the present invention.

The navigation inter-working unit 10 may be configured to inter-works with a navigation system (not shown) mounted within a vehicle and may be configured to periodically collect a variety of driving information. For example, the navigation inter-working unit 10 may be configured to collect information regarding an excess speed enforcement section (e.g., enforcement start point information and enforcement termination point information) from the navigation system. In particular, the excess speed enforcement section is shown in FIG. 2. In addition, the navigation inter-working unit 10 may be configured to collect an average driving speed of a vehicle in the excess speed enforcement section from the navigation system; information of a speed limit of the excess speed enforcement section from the navigation system; and vehicle speed information from the navigation system.

Further, the target speed calculating unit 20 may be configured to calculate a target speed of the vehicle based on a variety of information collected by the navigation inter-working unit 10. In other words, the target speed calculating unit 20 may be configured to calculate a target speed $v_t$ of the vehicle using the following Equation 1.

$$v_t = v_l + (v_l - v_d) \times \alpha \qquad \text{Equation 1}$$

wherein, $v_l$ is the speed limit of the excess speed enforcement section, $v_d$ is the average driving speed of the vehicle in the excess speed enforcement section, and $\alpha$ is a constant value as weight.

Since the target speed calculated as described above may change based on a difference between the speed limit and the average driving speed, excessive deceleration and acceleration and a vibration phenomenon of deceleration and acceleration may be prevented. For reference, the vibration phenomenon of the deceleration and acceleration is a phenomenon in which the deceleration and acceleration of the vehicle are repeated based on the difference between the speed limit and the average driving speed having a positive (+) value or a negative (−) value, and is generated due to a response of the average driving speed is late.

The lower limit speed calculating unit 30 may be configured to calculate a lower limit speed of the vehicle based on a variety of information collected by the navigation inter-working unit 10. In other words, the lower limit speed calculating unit 30 may be configured to calculate a lower limit speed $v_m$ of the vehicle using the following Equation 2.

$$v_m = v_l \times \beta \qquad \text{Equation 2}$$

wherein $\beta$ is a constant value as weight.

In general, since the average driving speed of the vehicle has characteristic in that even though the speed of the vehicle decreases, an effect thereof is not immediately reflected, when the speed of the vehicle is continuously decreased until the average driving speed becomes the speed limit, it may cause the vehicle to be stopped. To prevent the above-mentioned excessive deceleration from being generated, the lower limit speed $v_m$ may be set to prevent the vehicle speed from decreasing to a predetermined value or less.

Furthermore, the target speed determining unit 40 may be configured to determine one of the target speed $V_t$ calculated by the target speed calculating unit 20, the lower limit speed $v_m$ calculated by the lower limit speed calculating unit 30, and the speed limit $v_l$ collected by the navigation inter-working unit 10, as a final target speed $v_f$. In other words, when the target speed $v_t$ is less than the lower limit speed $v_m$ ($v_t < v_m$), the target speed determining unit 40 may be configured to determine the lower limit speed $v_m$ as the final target speed $v_f$. In addition, when the target speed $v_t$ is equal to or greater than the lower limit speed $v_m$ ($v_t \geq v_m$), the target speed determining unit 40 may be configured to determine the final target speed $v_f$ using a relationship between the target speed $v_t$ and the speed limit $v_l$. In other words, when the target speed $v_t$ is equal to or greater than the speed limit $v_l$, the target speed determining unit 40 may be configured to determine the speed limit $v_l$ as the final target speed $v_f$. As a result, when the target speed $v_t$ is equal to or greater than the lower limit speed $v_m$ and is equal to or greater than the speed limit $v_l$, the target speed determining unit 40 may be configured to determine the speed limit $v_l$ as the final target speed $v_f$. When the target speed $v_t$ is equal to or greater than the lower limit speed $v_m$ and is less than the speed limit $v_l$, the target speed determining unit 40 may be configured to determine the target speed $v_t$ as the final target speed $v_f$.

Furthermore, the required acceleration calculating unit 50 may be configured to calculate a required acceleration based on the final target speed $v_f$ determined by the target speed determining unit 40. In other words, the required acceleration calculating unit 50 may be configured to calculate a required acceleration a using the following Equation 3.

$$a=(v_f-v_c)\times\epsilon \qquad \text{Equation 3}$$

wherein $v_c$ is the vehicle speed and $\epsilon$ is a constant value as weight.

The speed controller 60 may be configured to adjust the vehicle speed using the calculated required acceleration. In other words, the speed controller 60 may be configured to adjust the vehicle speed using the required acceleration calculated periodically. The speed controller 60 may be implemented as a separate configuration as in the exemplary embodiment of the present invention, but may be implemented by assigning a function thereof to the SCC system.

In particular, when the function of the speed controller 60 is assigned to the SCC system, as shown in FIG. 2, the speed limit (e.g., about 100 KPH) in the excess speed enforcement section may be displayed to the driver before the vehicle arrives at the enforcement start point, the vehicle speed may be adjusted in the excess speed enforcement section based on the required acceleration described above, and when the vehicle exits from the excess speed enforcement section, the vehicle speed may be to a speed (e.g., about 120 KPH) preset in the SCC system.

Figure 3:
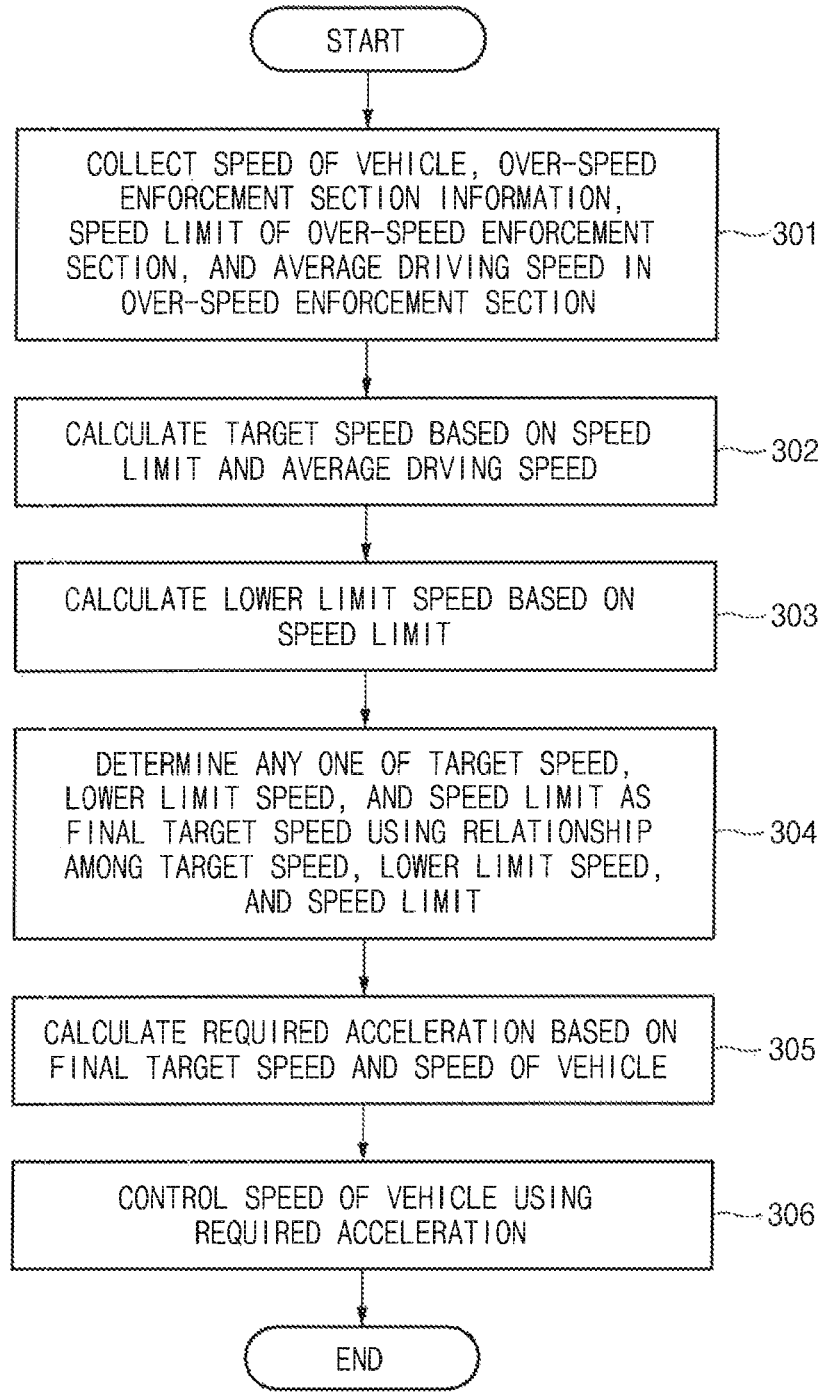
FIG. 3 is an exemplary flow chart of a method for controlling a speed in an over-speed enforcement section according to another exemplary embodiment of the present invention.

FIG. 3 is an exemplary flow chart of a method for controlling a speed in an over-speed enforcement section according to another exemplary embodiment of the present invention. The navigation inter-working unit 10 may be configured to collect the vehicle speed $v_c$, the excess speed enforcement section information, the speed limit $v_l$ of the excess speed enforcement section, and the average driving speed $v_d$ in the excess speed enforcement section (301).

The target speed calculating unit 20 may be configured to calculate the target speed $v_t$ based on the speed limit $v_l$ and the average driving speed $v_d$ (302). In addition, the lower limit speed calculating unit 30 may be configured to calculate the lower limit speed $v_m$ based on the speed limit $v_l$ (303). The target speed determining unit 40 may be configured to determine any one of a group consisting of the target speed $v_t$, the lower limit speed $v_m$, and the speed limit $v_l$ as the final target speed $v_f$ using the relationship between the target speed $v_t$, the lower limit speed $v_m$, and the speed limit $v_l$ (304). The required acceleration calculating unit 50 may be configured to calculate the required acceleration a based on the final target speed $v_f$ and the vehicle speed $v_c$ (305). The speed controller 60 may be configured to adjust the vehicle speed using the required acceleration a (306).

According to the exemplary embodiment of the present invention, the excess speed may be prevented from being generated in the excess speed enforcement section by adjusting the speed of the vehicle in the excess speed enforcement section thus enforcing a situation where the average driving speed of the vehicle exceeds the speed limit in the section from the enforcement start point to the enforcement termination point. In addition, according to the exemplary embodiment of the present invention, even when the accelerator pedal is engaged for a predetermined time, the speed of the vehicle may be maintained within the speed limit when the vehicle passes through the excess speed enforcement section.

The spirit of the present invention has been merely exemplified. It will be appreciated by those skilled in the art that various modifications and alterations can be made without departing from the essential characteristics of the present invention. Accordingly, the exemplary embodiments disclosed in the present invention and the accompanying drawings are used not to limit but to describe the spirit of the present invention. The scope of the present invention is not limited only to the exemplary embodiments and the accompanying drawings. The protection scope of the present invention must be analyzed by the accompanying claims and it should be analyzed that all spirit within a scope equivalent thereto are included in the accompanying claims of the present invention.

What is claimed is:

1. An apparatus for controlling a speed in an excess speed enforcement section, the apparatus comprising:
   a memory configured to store program instructions; and
   a processor configured to execute the program instructions,
      the program instructions when executed configured to:
         collect a vehicle speed, excess speed enforcement section information, a speed limit of the excess speed enforcement section, and an average driving speed in the excess speed enforcement section;
         calculate a target speed based on the speed limit and the average driving speed;
         calculate a lower limit speed based on the speed limit
         determine one of the target speed, the lower limit speed, and the speed limit as the final target speed using a relationship between the target speed $v_t$, the lower limit speed $v_m$, and the speed limit $v_l$;
         calculate a required acceleration based on the final target speed and the vehicle speed; and
         adjust the vehicle speed using the required acceleration,
      wherein the target speed of the vehicle is calculated using the following Equation 1

$$v_t=v_l+(v_l-v_d)\times\alpha \qquad \text{Equation 1}$$

wherein $\alpha$ represents a first constant, $v_l$ is the speed limit, $v_d$ is the average driving speed, and $v_t$ is the target speed.

2. The apparatus according to claim 1, wherein the lower limit speed of the vehicle is calculated using the following Equation 2

$$v_m=v_l\times\beta \qquad \text{Equation 2}$$

wherein $\beta$ is a second constant, $v_l$ is the speed limit, and $v_m$ is the lower limit speed.

3. The apparatus according to claim 1, wherein when the target speed is less than the lower limit speed, the lower limit speed is determined to be the final target speed.

4. The apparatus according to claim 1, wherein when the target speed is equal to or greater than the lower limit speed and is equal to or greater than the speed limit, the speed limit is determined to be the final target speed.

5. The apparatus according to claim 1, wherein when the target speed is equal to or greater than the lower limit speed and is less than the speed limit, the target speed is determined to be the final target speed.

6. The apparatus according to claim 1, wherein the required acceleration is calculated using the following Equation 3

$$a=(v_f-v_c)\times\epsilon \qquad \text{Equation 3}$$

wherein $\epsilon$ is a third constant, a is the acceleration, $v_f$ is the final target speed, and $v_c$ is the vehicle speed.

7. A method for controlling a speed in an excess speed enforcement section, the method comprising:
   collecting, by a controller, a vehicle speed, excess speed enforcement section information, a speed limit of the excess speed enforcement section, and an average driving speed in the excess speed enforcement section;
   calculating, by the controller, a target speed based on the speed limit and the average driving speed;

calculating, by the controller, a lower limit speed based on the speed limit;

determining, by the controller, one of the target speed, the lower limit speed, and the speed limit as the final target speed using a relationship between the target speed, the lower limit speed, and the speed limit;

calculating, by the controller, a required acceleration based on the final target speed and the vehicle speed; and adjusting, by the controller, the vehicle speed using the required acceleration, wherein the target speed of the vehicle is calculated using the following Equation 1

$$v_t = v_l + (v_l - v_d) \times \alpha \qquad \text{Equation 1}$$

wherein $\alpha$ represents a first constant, $v_l$ is the speed limit, $v_d$ is the average driving speed, and $v_t$ is the target speed.

8. The method according to claim 7, wherein the lower limit speed of the vehicle is calculated using the following Equation 2

$$v_m = v_l \times \beta \qquad \text{Equation 2}$$

wherein $\beta$ is a second constant, $v_l$ is the speed limit, and $v_m$ is the lower limit speed.

9. The method according to claim 7, further comprising:

when the target speed is less than the lower limit speed, determining, by the controller, the lower limit speed as the final target speed;

when the target speed is equal to or greater than the lower limit speed and is equal to or greater than the speed limit, determining, by the controller, the speed limit as the final target speed; and when the target speed is equal to or greater than the lower limit speed and is less than the speed limit, determining, by the controller, the target speed as the final target speed.

10. The method according to claim 7, wherein the required acceleration is calculated using the following Equation 3

$$a = (v_f - v_c) \times \epsilon \qquad \text{Equation 3}$$

wherein $\epsilon$ is a third constant, a is the acceleration, $v_f$ is the final target speed, and $v_c$ is the vehicle speed.

11. A non-transitory computer readable medium containing program instructions executed by a controller, the computer readable medium comprising:

program instructions that collect a vehicle speed, excess speed enforcement section information, a speed limit of the excess speed enforcement section, and an average driving speed in the excess speed enforcement section;

program instructions that calculate a target speed based on the speed limit and the average driving speed;

program instructions that calculate a lower limit speed based on the speed limit;

program instructions that determine one of the target speed, the lower limit speed, and the speed limit as the final target speed using a relationship between the target speed, the lower limit speed, and the speed limit;

program instructions that calculate a required acceleration based on the final target speed and the vehicle speed; and program instructions that adjust the vehicle speed using the required acceleration, wherein the target speed of the vehicle is calculated using the following Equation 1

$$v_t = v_l + (v_l - v_d) \times \alpha \qquad \text{Equation 1}$$

wherein $\alpha$ represents a first constant, $v_l$ is the speed limit, $v_d$ is the average driving speed, and $v_t$ is the target speed.

12. The non-transitory computer readable medium of claim 11, wherein the lower limit speed of the vehicle is calculated using the following Equation 2

$$v_m = v_l \times \beta \qquad \text{Equation 2}$$

wherein $\beta$ is a second constant, $v_l$ is the speed limit, and $v_m$ is the lower limit speed.

13. The non-transitory computer readable medium of claim 11, wherein when the target speed is less than the lower limit speed, the lower limit speed is determined to be the final target speed.

14. The non-transitory computer readable medium of claim 11, wherein when the target speed is equal to or greater than the lower limit speed and is equal to or greater than the speed limit, the speed limit is determined to be the final target speed.

15. The non-transitory computer readable medium of claim 11, wherein the required acceleration is calculated using the following Equation 3

$$a = (v_f - v_c) \times \epsilon \qquad \text{Equation 3}$$

wherein $\epsilon$ is a third constant, a is the acceleration, $v_f$ is the final target speed, and $v_c$ is the vehicle speed.

* * * * *